United States Patent [19]

Mez

[11] 4,304,423

[45] Dec. 8, 1981

[54] APPARATUS FOR AIR CONDUCTING DUCT

[76] Inventor: George Mez, Gartenstrasse 30A, 7410 Reutlingen-Gonningen, Fed. Rep. of Germany

[21] Appl. No.: 40,988

[22] Filed: May 21, 1979

[51] Int. Cl.³ .............................................. F16L 25/00
[52] U.S. Cl. ...................................... 285/47; 285/286; 285/319; 285/331; 285/424; 285/DIG. 22; 285/405
[58] Field of Search ................. 285/424, 405, 363, 47, 285/55, 45, 319, 331, DIG. 22, 286; 138/109

[56] References Cited

U.S. PATENT DOCUMENTS

| | | | |
|---|---|---|---|
| 2,916,054 | 12/1954 | Cullan | 285/424 X |
| 3,675,950 | 7/1972 | Beene | 285/45 |
| 3,712,650 | 1/1973 | Mez | 285/424 |
| 3,836,181 | 9/1974 | Kelver | 285/424 |

FOREIGN PATENT DOCUMENTS 1270228  4/1972  United Kingdom ................. 285/47

*Primary Examiner*—Dave W. Arola

[57] ABSTRACT

The device holds the ends of insulating mats against the inside walls of air ducts at the ends of the ducts where frame pieces form external glands on the ducts. The frame piece has a stay which rests on the outside of the air duct wall and a stay which rests on the inside of the air duct wall. The inner stay is bent back on itself and with multiple bends forms a longitudinally opening pocket which has a transverse-running catch strip with a v-shaped groove form at its free end, pointing towards the inner stay. A cross-connecting spot weld connects the outside stay, the duct wall, the inside stay and the bent back portion of the inner stay. A u-shaped, plastic holding strip, which is large enough in cross-section to hold the edge of the insulating mat, has a catch strip portion which is complementary to the catch strip portion of the pocket and can be flexibly inserted in the pocket so that the edge of the insulating mat can be inserted in the space between the outer wall of the u-shaped holding strip and the catch strip on the bent back portion of the inner stay.

23 Claims, 3 Drawing Figures

APPARATUS FOR AIR CONDUCTING DUCT

The invention relates to a device for holding that edge of inner insulating mats which extends transversely to the longitudinal axis of an air-conducting duct having a metallic frame piece forming a prefabricated gland. The metallic frame piece has a stay which runs inside the appropriate wall of the air-conducting duct, flush against the latter, and also has a cross-connection which, in the assembled state, connects a stay of the frame piece resting on the outside of the duct wall, the duct wall and the inner stay of the frame piece firmly together.

As used in this specification, the term "stay" means a strip of metal used to stiffen or support a part and the term "gland" means a part used for sealing or holding a part in place.

BACKGROUND OF THE INVENTION

Air-conducting ducts of this type are known, e.g. through U.S. Pat. No. 3,712,650 which issued to the same inventor on Jan. 23, 1973. The shape of such frame pieces is likewise known from this patent. The prefabricated glands are inserted on the front face of an air-conducting duct and then connected to the walls of the air-conducting duct with the aid of cross-connections. These cross-connections are usually spot-welding spots, but sometimes they are screws or rivets.

Two prefabricated glands each lie flush against each other, where a sealing strip is also added between their stays positioned perpendicularly to the duct wall.

The one gland may, however, not be prefabricated and belong, for example, to a ventilating appliance.

Such air-conducting ducts may have cross-section dimensions in the region of several decimeters to several meters. For reasons of sound insulation and/or heat insulation, it is sometimes necessary to cover the insides of the walls with insulating mats. Fastening of the mat to an extended part of the duct presents no considerable difficulty. The insulating mats usually have a relatively resistant skin on both sides and the material situated in between is very loose. With this skin, the insulating mats can be fastened, e.g. cemented to the inside of the walls.

The skin of the insulating mat cannot, however, be cemented at the point where the inner stay of the frame piece is situated. Nevertheless, they must be held there correctly from the point of view of flow technology, refrigeration technology and sound technology.

OBJECTS AND STATEMENT OF THE INVENTION

The objects of the invention are to provide a device which allows the advantages of prefabricated glands to be obtained, does not make re-thinking obligatory, is inexpensive, makes it possible to work without special tools and gives the edges of the mats good stability even with high flow speeds, whether it be on the upstream or downstream side. Good flow-technological, sound-technological and heat-technological results must be obtained.

According to the invention, these objectives are achieved by the following features:
(a) The inner stay of the frame piece is bent back on itself, with multiple bends, forming a pocket.
(b) The pocket is open in the longitudinal direction of the air-conducting duct and has a catch strip which runs transversely over the entire length of the pocket and points towards the inner stay,.
(c) A holding strip composed of plastic is provided, having a heat-conducting value which lies considerably below that of the metal of the frame piece, and a cross-section which is large enough to hold the edge of the insulating mat.
(d) One piece of the holding strip has a catch strip which is complementary to the catch strip of the pocket and can be flexibly inserted in the pocket.

The insulating mat is thereby prevented from being partly blown away or possibly being inflated like a bag. The frame piece even gains rididity. The rational rolling process can be used for manufacturing it, as hitherto. Supplementary expenditure is minimal.

The bent back stay portion of the inner stay of the frame piece originates from the inner edge of the inner stay. As a result of this feature, it is possible to manage with a minimum of material and a minimum of rabbetings.

The bent back stay portion runs at least as far as the cross-connection on the inner stay of the frame piece. As a result of this feature, the cross-section is also additionally used to reduce the spring constant considerably, in relation to forces in the opening direction. The pocket can then spring open only to the extent that the catch strip presses the one piece of the holding strip constantly in an outward direction into flush contact against the pocket wall.

The bent back stay portion has a z-shaped or jogged portion following the cross-connection. As a result of this feature, the transition into the floor of the pocket is obtained by simple means and the pocket is made to open outwardly.

The catch strip of the pocket is provided at the free end of the bent back stay portion. As a result of this feature, the flexible properties of the bent back stay are fully utilized, and in a case where the pocket is outwardly open, the catch strip of the holding strip is retained at an advantageous point, namely the outer area.

The catch strip of the pocket has a v-shaped groove form. As a result of this feature, a good toothing is ensured on the one hand, and a catching flank is produced on the other hand, and thirdly, the catch strip has a reinforcing resistance moment.

The catch strip portion of the holding strip has several parallel v-shaped grooved strips which fit the v-shaped projection on the catch strip. As a result of this feature, the holding strip is able to be brought initially into a first catch position and the edge of the insulating mat can be held at a distance. Without the holding strip dropping, it is then possible to pass to the next catch step and hold the edge continuously until it is retained completely.

Since the holding strip has a u-shaped profile, a simple holding strip which can easily be extruded is obtained, which as a high resistance moment itself, which with its outer walls easily fits the outer contour of the insulating mat, whose cross-piece can be shaped so easily that there is practically no spacing between it and the adjacent cross-piece, and which, with a flat cross-piece, also offers a sufficiently large impact surface which is not equally flexible when a hammer is used for working, because the specific surface pressures are small.

The catch strip portion of the holding strip is 0.5 to 1 times as wide as the outer wall of the holding strip. As a result of this feature, the material consumption for the holding strip is reduced, insofar as the catch strip is narrower than the outer wall of the strip, and the catch strip is sufficiently long on the other hand to be able to absorb any possible bending stresses during transport or in operation.

The cross piece of the holding strip, in the assembled state, is set back slightly inwards in relation to an outer wall of the frame piece which is positioned perpendicular to the wall of the duct. As a result of this feature, the assembled duct can be transported in the normal way without running the risk of its resting unintentionally on the plastic holding strips.

If the cross-connection is a welding spot, no additional measures are required in order to make the pocket resistant to deflection forces.

DESCRIPTION OF THE DRAWINGS

Preferred embodiments of the invention are described hereafter, with reference to the drawings, in which, the arrangement of the Figures essentially corresponds to the arrangement according to FIG. 2 of U.S. Pat. No. 3,712,650.

In the Drawings.

DETAILED DESCRIPTION OF THE PREFERRED EMBODIMENTS

Figure 1:
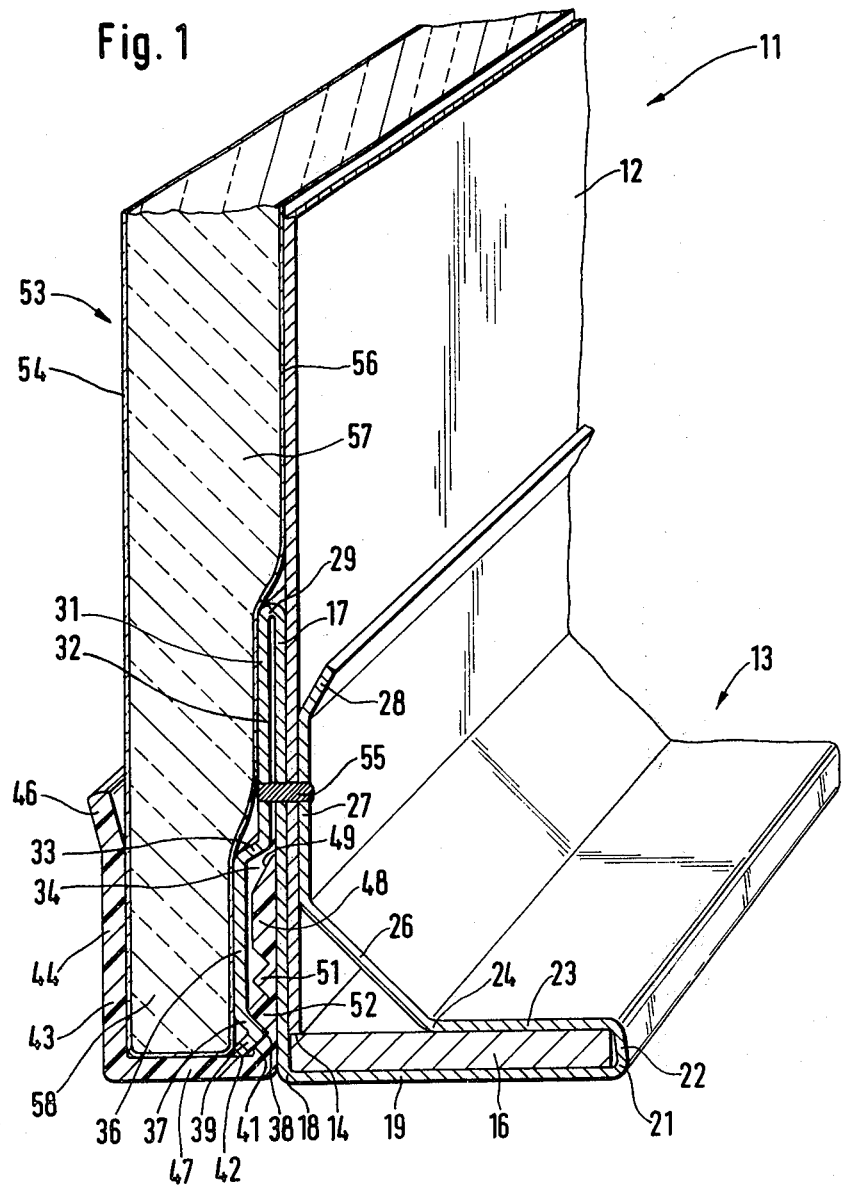
FIG. 1 shows a cross-section through a first embodiment in its edge region on the scale of 2:1.

An air-conducting duct 11 has four sheet-metal walls 12. At the end of it there are frame pieces 13 composed of endlessly rolled sheet-metal which extend parallel to the edge 14 of the wall 12 and are joined together by four angle brackets whose pieces 16 are fixed into the frame pieces 13.

Each frame piece has an inner stay 17, which extends along the inside, butting against the duct wall 12. The stay 17 runs, after a 90° bend, into a stay 19, which stands perpendicular to the relevant duct wall 12. Against the duct wall, on the inside, the surface of the angle bracket piece 16 butts in the corner area of the prefabricated gland. After a bend 21 of approximately 90°, the stay 19 runs into a narrow cross-stay 22. The latter runs after a further bend through approximately 90° into a stay 23, which runs parallel to the stay 19. After this, there follows after a 45° bend 24, a sloping stay 26, and the latter, after a 45° bend, runs into a cover stay 27, against the inside of which the relevant duct wall 12 lies flush and which has an insertion slope 28 for the duct wall 12 at its end.

The shape described up to now is known.

The frame piece at its inner stay 17 runs into a bend 29 of 180°, after which the bent back stay 31 runs downward. In detail, the bent back stay 31 has a stay portion 32, which is roughly half as wide as the stay 17. A z-shaped or jogged portion 33 connects to the outside of the stay portion 32, whereby the floor of a pocket 34 is formed. After the z-shaped corner molding 33, follows an outwardly pointed catch strip 36, which runs substantially parallel to the stay 17 and at its outer end has a v-shaped projection 37, whose tip 38 points towards the stay 17 but leaves a spacing of approximately 1.5 mm from the latter.

The v-shaped projection 37 has on the outside a wing 39, which is considerably longer than the other wing forming the v-shaped projection 37, and having a surface 41 pointing towards the pocket 34 which is a catch surface. The wing 39 has an outwardly pointed tip 42. The latter has a definite minimum spacing from the geometrical surface which can be placed in the outside of the stay 19.

A holding strip 43 is endlessly injection-molded from plastic and has a considerably smaller heat-conducting resistance than the parts which have been discussed up to now. It has a roughly 25 mm wide outer wall 44, which at its inwardly pointed end runs into a slope 46. The unreduced material of the holding strip 43 is 2 mm thick.

At its outer end, the outer wall 44 runs into a flat cross-piece 47, whose outside is set back by roughly 1 mm in relation to the geometrical surface which can be covered by the outside of the stay 19. This dimension is correct when the inside of the cross-piece 47 touches the tip 42.

The roughly 15 mm wide cross-piece 47 then runs after a 90° angle into a catch strip 48. This fits in the pocket 34. At its free end, the catch strip 48 has an inwardly pointing slope 49 which, during assembly, cooperates with the surface 41. The slope 49 runs into a point on the inside. The outside of the catch strip 48 lies flush against the inside of the stay 17, which to that extent forms one wall of the pocket 34. Roughly in the half of the catch strip 48 facing the cross-strip 47 there are provided several v-shaped grooved strips 51 and 52, which are complementary to the v-shaped projection 37. A welding spot 55 extends transversely through the cover stay 27, the duct wall 12, the inner stay 17 and the bent back stay 32. This lies relatively close to the z-shaped portion 33, so that the catch strip 36 becomes a relatively hard spring and the bend 29 does not serve as a flexible pivoting point. With correct dimensioning, the v-shaped projection 37 when pressing against the v-shaped grooved strip 52, presses the catch strip 48 forcefully against the inner wall 17.

An insulating mat 53 has an inner skin 54 and an outer skin 56. The latter is cemented to the duct wall 12 from the inside, with the exception of the area which is situated in the region of the frame piece 13. Between the inner skin 54 and the outer skin 56, there is loose insulating material. The outer edge 58 of the insulating mat 53 is inserted into the space which is formed by the outer wall 44, the cross-piece 47 and the catch strip 36. The edge 58 can be firmly cemented, but it is sufficient for it to be plugged in at this point. As FIG. 1 shows, the edge 58 must be slightly compressed here, because other layers of different structural elements also lie between the duct wall 12 and the outer wall 44 and intentionally take up some space.

The circular bend 29 and the z-shaped corner molding 33 ensure that the outer skin has a smooth course 56.

Figure 2:
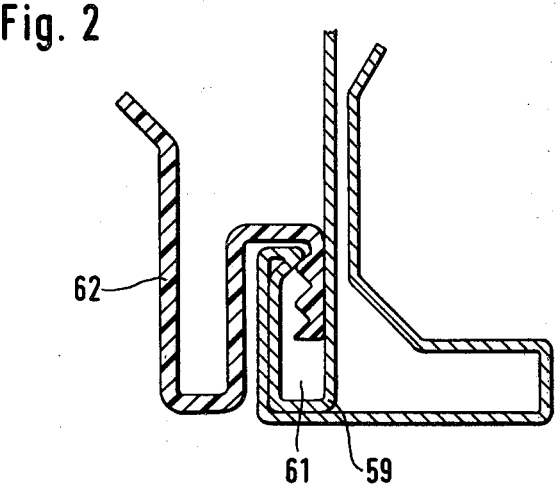
FIG. 2 shows a diagrammatic representation of a second embodiment of the invention.
Figure 3:
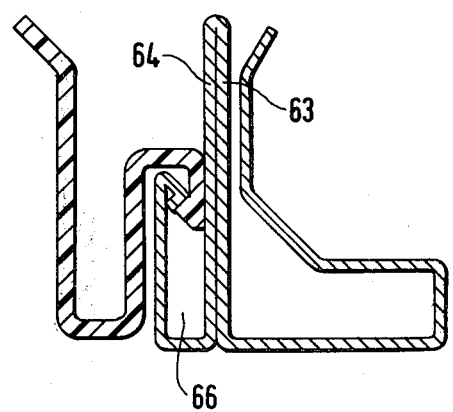
FIG. 3 shows a diagrammatic representation of a third embodiment of the invention.

The exemplified embodiments according to FIGS. 2 and 3 are technically not as elegant as the embodiment according to FIG. 1.

In FIG. 2, the bend 59 begins at the outer edge of the wall 17, and the pocket 61 is inwardly open. The floor of the pocket 61 and the catch strip of the pocket 61 must be double-layer-rolled if working from the coil downwards is desired.

The holding strip 62 also present here is inwardly open, and requires the shape which can be seen in FIG. 2 to engage in the pocket 61.

FIG. 3 shows a specific embodiment similar to FIG. 2, but with less consumption of metal. Here—as in the first embodiment—the stay 63 on its inner edge runs into a bend. A stay 64 is then rolled back onto it, and thereafter follows the formation of the pocket 66. This exemplified embodiment is slightly better to roll than that of FIG. 2.

What I claim is:

1. In a device for holding the edge of inner insulating mats which extend transversely to the longitudinal direction of an air-conducting duct in the area of a metal frame piece which forms a prefabricated gland, in which the frame piece has a stay which runs inside the wall of the air-conducting duct and lies against the latter, a stay which rests on the outside of the duct wall and a connection means which, in the assembled state, connects the stay of the frame piece resting on the outside of the duct wall, the duct wall and the inner stay of the frame piece firmly together; the improvement in which:

(a) the inner stay is bent back on itself with multiple bends, thereby forming a pocket;
    (b) the pocket is open in the longitudinal direction of the air-conducting duct toward the duct opening and the bent back stay portion has a catch strip which runs transversely along the pocket and points towards the inner stay;
    (c) a holding strip of plastic is provided, having a heatconducting value which lies considerably below that of the metal of the frame piece and a cross piece large enough to fit over and hold the edge of an insulating mat against the bent back stay portion and a catch strip portion which is complementary to the catch strip on the bent back stay portion and which can be flexibly inserted in the pocket and retained therein by the catch strip on the bent back stay portion.

2. The device according to claim 1, in which the bent back stay portion of the inner stay of the frame piece originates from the inner edge of the inner stay.

3. The device according to claim 1 in which the bent back stay portion runs past the connection means on the inner stay of the frame piece toward the duct opening.

4. The device according to claim 2, in which the bent back stay portion has a jogged portion following the connection means.

5. The device according to claims 1, 2, 3 or 4 in which the catch strip is provided at the free end of the bent back stay portion.

6. The device according to claim 1, in which the catch strip has a v-shaped groove form.

7. The device according to claim 6, in which the catch strip portion of the holding strip has several parallel v-shaped grooves which individual fit an individual v-shaped projection on the catch strip.

8. The device according to claims 1, 2, 3, 4, 6 or 7, in which the holding strip has a u-shaped profile.

9. The device according to claim 1, in which the catch strip portion of the holding strip is 0.5 to 1 times as wide as the outer wall of the holding strip.

10. The device according to claim 1, in which the cross piece of the holding strip, in the assembled state, is set back slightly inwards in relation to an outer wall of the frame piece which is positioned perpendicular to the wall of the duct.

11. The device according to claim 1, in which the connection means is a spot welded connection.

12. A metal frame piece for use in holding the edge of inner insulating mats which extend transversely to the longitudinal direction of an air-conducting duct, and which forms a prefabricated gland for the air-conducting duct, in which the frame piece has a stay which runs inside the wall of the air-conducting duct and lies against the latter, a stay which rests on the outside of the duct wall and a connection means which, in the assembled state, connects the stay of the frame piece resting on the outside of the duct wall, the duct wall and the inner stay of the frame piece, firmly together; comprising the improvement in which:

(a) the inner stay is bent back on itself with multiple bends, thereby forming a pocket; and
    (b) the pocket is open in the longitudinal direction of the air-conducting duct toward the duct opening and the bent back stay portion has a catch strip which runs transversely along the pocket and points towards the inner stay.

13. The frame piece according to claim 12 in which the bent back stay portion of the inner stay of the frame piece originates from the inner edge of the inner stay.

14. The frame piece according to claim 12 in which the bent back stay portion runs past the connection means on the inner stay of the frame piece towards the duct opening.

15. The frame piece according to claim 13 in which the bent back stay portion has a jogged portion following the connection means.

16. The frame piece according to claims 12, 13, 14, or 15 in which the catch strip is provided at the free end of the bent back stay portion.

17. The frame piece according to claim 12 in which the catch strip has a v-shaped groove form.

18. The frame piece according to claim 12 in which the connection means is a spot welded connection.

19. A holding strip for use in holding the edge of inner insulating mats which extend transversely to the longitudinal direction of an air-conducting duct in the area of a metal frame piece which forms a prefabricated gland, in which the frame piece has a pocket formed in part by a bent back stay portion which is open in the longitudinal direction of the air-conducting duct toward the duct opening and a catch strip on said bent back stay portion which runs transversely along the pocket and points toward a wall of the duct; comprising the improvement in which:

the holding strip is of plastic having a heat-conducting value which lies considerably below that of the metal of the frame piece and a cross piece large enough to fit over and hold the edge of an insulating mat against the bent back stay portion, and a catch strip portion which is complementary to the catch strip on the pocket and which can be flexibly inserted in the pocket and retained thereon by the catch strip on the bent back stay portion.

20. The holding strip according to claim 19, in which the catch strip portion of the holding strip has several parallel v-shaped grooves which individually fit an individual v-shaped projection on the catch strip.

21. The holding strip according to claims 19 or 20, in which the holding strip has a u-shaped profile.

22. The holding strip according to claim 19, in which the catch strip portion of the holding strip is 0.5 to 1 times as wide as the outer wall of the holding strip.

23. The holding strip according to claim 19, in which the cross piece of the holding strip, in the assembled state, is set back slightly inwards in relation to an outer wall of the frame piece which is positioned perpendicular to the wall of the duct.

* * * * *